US012573375B2

(12) United States Patent
Lee et al.

(10) Patent No.: US 12,573,375 B2
(45) Date of Patent: Mar. 10, 2026

(54) ELECTRONIC DEVICE AND CONTROL METHOD THEREOF

(71) Applicant: SAMSUNG ELECTRONICS CO., LTD., Suwon-si (KR)

(72) Inventors: Jihwan Lee, Suwon-si (KR); Jounyeop Lee, Suwon-si (KR); Heejin Choi, Suwon-si (KR); Seongkyu Mun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 197 days.

(21) Appl. No.: 18/191,448

(22) Filed: Mar. 28, 2023

(65) Prior Publication Data

US 2023/0326447 A1 Oct. 12, 2023

Related U.S. Application Data

(63) Continuation of application No. PCT/KR2023/003181, filed on Mar. 8, 2023.

(30) Foreign Application Priority Data

Mar. 16, 2022 (KR) ........................ 10-2022-0032982
Dec. 9, 2022 (KR) ........................ 10-2022-0171848

(51) Int. Cl.
*G10L 15/00* (2013.01)
*G10L 13/047* (2013.01)
(Continued)

(52) U.S. Cl.
CPC ............ *G10L 13/10* (2013.01); *G10L 13/047* (2013.01); *G10L 15/1815* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 5,157,759 A | 10/1992 | Bachenko | |
| 8,645,141 B2 | 2/2014 | Wong | |

(Continued)

FOREIGN PATENT DOCUMENTS

| | | |
|---|---|---|
| CN | 113658587 A | 11/2021 |
| KR | 10-0807307 | 2/2008 |

(Continued)

OTHER PUBLICATIONS

Wang et al., "Style tokens: Unsupervised style modeling, control and transfer in end-to-end speech synthesis", Pub Date: Mar. 23, 2018, 11 pages.

(Continued)

*Primary Examiner* — Satwant K Singh
(74) *Attorney, Agent, or Firm* — Nixon & Vanderhye, P.C.

(57) ABSTRACT

An example electronic device and an example control method thereof are provided. The example electronic device may include: a memory configured to store information about a plurality of intonation templates, which are obtained by training an intonation template generator based on a plurality of voice signals and represent intonations of the plurality of voice signals; and a processor configured to, when a voice signal is received, obtain information about a user's intention corresponding to the voice signal, obtain first text to respond to the voice signal, based on the voice signal and the information about the user's intention, identify an intonation template corresponding to the first text based on the information about the plurality of intonation templates by inputting information about the first text to an intonation classifier, obtain intonation information corre- (Continued)

100

110     120

MEMORY ←→ PROCESSOR sponding to the identified intonation template by inputting information about the identified intonation template to the intonation encoder, and obtain an output voice signal corresponding to text by inputting the first text and the intonation information to a voice synthesis module.

20 Claims, 12 Drawing Sheets

(51) Int. Cl.
  *G10L 13/10* (2013.01)
  *G10L 15/18* (2013.01)
  *G10L 15/22* (2006.01)

(56) References Cited

U.S. PATENT DOCUMENTS

| | | | |
|---|---|---|---|
| 10,602,234 B2 * | 3/2020 | Sanchez | H04N 21/8405 |
| 11,107,456 B2 | 8/2021 | Chae et al. | |
| 11,375,287 B2 * | 6/2022 | Sanchez | H04N 21/466 |
| 11,514,887 B2 | 11/2022 | Kim et al. | |
| 11,545,135 B2 | 1/2023 | Kanagawa et al. | |
| 2006/0129393 A1 | 6/2006 | Oh et al. | |
| 2008/0010070 A1 | 1/2008 | Kim et al. | |
| 2011/0123965 A1 * | 5/2011 | Yu | G09B 19/04 |
| | | | 434/156 |
| 2012/0065979 A1 | 3/2012 | Wong | |
| 2017/0092258 A1 | 3/2017 | Edrenkin | |
| 2017/0358293 A1 * | 12/2017 | Chua | G10L 13/0335 |
| 2018/0114522 A1 * | 4/2018 | Hall | G10L 13/02 |
| 2019/0251952 A1 * | 8/2019 | Arik | G10L 13/08 |
| 2020/0005763 A1 | 1/2020 | Chae et al. | |
| 2020/0082807 A1 | 3/2020 | Kim et al. | |
| 2020/0394998 A1 | 12/2020 | Kim et al. | |
| 2020/0402497 A1 | 12/2020 | Semenov et al. | |
| 2021/0035551 A1 | 2/2021 | Stanton et al. | |
| 2021/0104236 A1 | 4/2021 | Doggett et al. | |
| 2021/0287656 A1 * | 9/2021 | Bonafonte | G10L 15/22 |
| 2021/0350786 A1 | 11/2021 | Chen et al. | |
| 2023/0110905 A1 * | 4/2023 | Shih | G10L 25/90 |
| | | | 704/232 |

FOREIGN PATENT DOCUMENTS

| | | |
|---|---|---|
| KR | 100806287 B1 | 2/2008 |
| KR | 20120121298 A | 11/2012 |
| KR | 20130059408 A | 6/2013 |
| KR | 20190085882 A | 7/2019 |
| KR | 20190104269 A | 9/2019 |
| KR | 20210012265 A | 2/2021 |
| KR | 10-2326853 | 11/2021 |
| KR | 20190068021 A1 | 11/2021 |
| KR | 10-2353284 | 1/2022 |
| KR | 20220000391 A | 1/2022 |
| WO | 2018/048934 | 3/2018 |
| WO | 2020071213 A1 | 4/2020 |
| WO | 2021025844 A1 | 2/2021 |

OTHER PUBLICATIONS

Skerry-Ryan et al., "Towards End-to-End Prosody Transfer for Expressive Speech Synthesis with Tacotron", Pub Date: Mar. 24, 2018, 11 pages.
Search Report dated Jun. 27, 2023 in International Application No. PCT/KR2023/003181.
Written Opinion dated Jun. 27, 2023 in International Application No. PCT/KR2023/003181.
Extended Search Report dated Jan. 20, 2025 in European Patent Application No. 23771024.9.

* cited by examiner

ELECTRONIC DEVICE AND CONTROL METHOD THEREOF

CROSS-REFERENCE TO RELATED APPLICATIONS

This application is a continuation of International Application No. PCT/KR2023/003181 designating the United States, filed on Mar. 8, 2023, in the Korean Intellectual Property Receiving Office and claiming priority to Korean Patent Application No. 10-2022-0032982 filed on Mar. 16, 2022 in the Korean Intellectual Property Office, and to KR Patent Application No. 10-2022-0171848 filed on Dec. 9, 2022 in the Korean Intellectual Property Office. The disclosures of each of these applications are incorporated by reference herein in their entireties.

BACKGROUND

Field

The disclosure relates to an electronic device and a control method thereof, and particularly, to an electronic device capable of synthesizing voice to reflect intonation matching the intention of an utterance, and a control method thereof.

Description of the Related Art

With the recent development of artificial intelligence (AI) technology, voice synthesis technology, also called text-to-speech (TTS), is being used in various fields of technologies, including interactive virtual assistant services, AI speakers, robots, etc., together with voice recognition technology.

However, generally, in the case of conventional voice synthesis technology, text is simply recited in a certain style to deliver information. In particular, although the meaning or nuance of a sentence may vary according to the intonation of the sentence, it is not easy to perform a natural conversation function, which is required in the field of virtual assistant services or robot technology, with current technologies.

It has been indicated that a technique for modifying the style of output voice for voice synthesis has recently been developed but is limited in that it is difficult to adjust only the intonation of voice specifically, although an overall style of the voice can be modified. It has also been indicated that the technique requires a lot of data and time to train a neural network model for voice synthesis.

SUMMARY

To address the above problem of the related art, embodiments of the disclosure provide an electronic device capable of synthesizing voice to reflect intonation matching an intention of an utterance, and a control method thereof.

According to an example embodiment of the disclosure, an electronic device includes: a memory configured to store information about a plurality of intonation templates, which are obtained by training an intonation template generator based on a plurality of voice signals and represent intonations of the plurality of voice signals; and a processor configured to, when a user voice signal is received, obtain information about a user's intention corresponding to the voice signal, obtain first text to respond to the voice signal, based on the voice signal and the information about the user's intention, identify an intonation template corresponding to the first text based on the information about the plurality of intonation templates by inputting information about the first text to an intonation classifier, obtain intonation information corresponding to the identified intonation template by inputting information about the identified intonation template to an intonation encoder, and obtain an output voice signal corresponding to the first text by inputting the first text and the intonation information to a voice synthesis module.

Here, the intonation template generator may be trained by unsupervised learning based on the plurality of voice signals without using text data, and the information about the plurality of intonation templates may be classified according to pitches of the plurality of voice signals.

The processor may be further configured to obtain a plurality of scores representing probabilities that the voice signal corresponds to the plurality of intonation templates by inputting the voice signal to the intonation template generator, obtain the information about the user's intention based on the plurality of scores, and obtain the first text by inputting the voice signal and the information about the user's intention to a text obtaining module.

The processor may be further configured to identify the user's intention among a plurality of predefined intentions by inputting the plurality of scores to an intent mapper, obtain second text corresponding to the voice signal by inputting the voice signal to a voice recognition module, and obtain the first text to respond to the second text by inputting the second text and the information about the user's intention to a natural language understanding module.

Here, the processor may be further configured to obtain information representing context of the second text by inputting the second text to the natural language understanding module, and identify the intonation template corresponding to the first text by inputting the first text and the information representing the context of the second text to the intonation classifier.

The processor may be further configured to input the first text to the intonation classifier to identify the intonation template corresponding to the first text among the plurality of templates or among combinations of at least some templates among the plurality of templates.

The plurality of voice signals may be obtained based on a voice of a certain speaker selected by the user.

When a user input for changing an intonation template identified by the intonation classifier to another intonation template is received, the processor may be further configured to obtain the intonation information by inputting information about the other intonation template to the intonation encoder.

The processor may be further configured to obtain a vector corresponding to the first text by inputting the first text to a text encoder included in the voice synthesis module, identify an intonation template corresponding to the vector based on the information about the plurality of intonation templates by inputting the vector corresponding to the first text to the intonation classifier, and obtain an output voice signal corresponding to the text by inputting the vector and the intonation information to an audio decoder included in the voice synthesis module.

According to an embodiment of the disclosure, a control method of an electronic device includes obtaining information about a user's intention corresponding to a user voice signal when the voice signal is received, obtaining first text to respond to the voice signal, based on the voice signal and the information about the user's intention, identifying an intonation template corresponding to the first text based on information about a plurality of intonation templates, the plurality of intonation templates being obtained by training an intonation template generator by unsupervised learning based on a plurality of voice signals and representing intonations of the plurality of voice signals, obtaining intonation information corresponding to the identified intonation template; and obtaining an output voice signal corresponding to the first text by inputting the first text and the intonation information to a voice synthesis module.

Here, the information about the plurality of intonation templates may be obtained by performing unsupervised learning on an intonation template generator based on the plurality of voice signals without using text data, and is classified according to pitches of the plurality of voice signals.

The obtaining of the information about the user's intention may include obtaining a plurality of scores representing probabilities that the voice signal corresponds to the plurality of intonation templates and obtaining the information about the user's intention based on the plurality of scores, and the obtaining of the first text may include obtaining the first text by inputting the voice signal and the information about the user's intention to a text obtaining module.

The control method of the electronic device may further include identifying the user's intention among a plurality of previously defined intentions based on the plurality of scores, obtaining second text corresponding to the voice signal by inputting the voice signal to a voice recognition module, and obtaining the first text to respond to the second text by inputting the second text and the information about the user's intention to a natural language understanding module.

The control method of the electronic device may further include obtaining information representing context of the second text by inputting the second text to the natural language understanding module, and identifying the intonation template corresponding to the first text based on the first text and the information representing the context of the second text.

The identifying of the intonation template may include identifying the intonation template corresponding to the first text among the plurality of intonation templates or among combinations of at least some intonation templates among the plurality of intonation templates.

The plurality of voice signals may be obtained based on a voice of a certain speaker selected by the user.

When a user input for changing the identified intonation template to another intonation template is received, the obtaining of the intonation information may include obtaining the intonation information based on information about the other intonation template.

The control method of the electronic device may further include obtaining a vector corresponding to the first text, identifying the intonation template corresponding to the vector based on the information about the plurality of intonation templates, and obtaining an output voice signal corresponding to the text based on the vector and the intonation information.

According to an embodiment of the disclosure, a non-transitory computer-readable recording medium stores a program for an electronic device, which includes obtaining information about a user's intention corresponding to a user voice signal when the voice signal is received, obtaining first text to respond to the voice signal, based on the voice signal and the information about the user's intention, identifying an intonation template corresponding to the first text based on information about a plurality of intonation templates, the plurality of intonation templates being obtained by training an intonation template generator by unsupervised learning based on a plurality of voice signals and representing intonations of the plurality of voice signals, obtaining intonation information corresponding to the identified intonation template, and obtaining an output voice signal corresponding to the first text by inputting the first text and the intonation information to a voice synthesis module.

BRIEF DESCRIPTION OF THE DRAWINGS

The above and/or other aspects of the disclosure will be more apparent by describing certain embodiments of the disclosure with reference to the accompanying drawings, in which:

FIG. 5 is a diagram for describing an example text encoder and an example audio decoder according to various embodiments;

DETAILED DESCRIPTION

Figure 1:
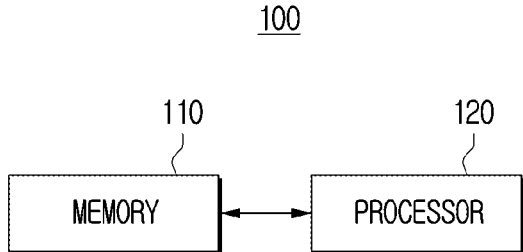
FIG. 1 is a block diagram schematically illustrating a configuration of an example electronic device according to various embodiments.

Various modifications may be made in example embodiments of the disclosure and various embodiments may be implemented. Thus, example embodiments are illustrated in the drawings and described in detail in the detailed description. However, the scope of the disclosure is not limited to particular example embodiments and it should be understood to include various modifications, equivalents, and/or alternatives of the example embodiments. In describing the drawings, like reference numerals may be assigned to like components.

In the following description of the disclosure, related well-known functions or components are not described in detail when it is determined that they would obscure the subject matter of the disclosure due to unnecessary detail.

In addition, example embodiments set forth herein may be modified in various forms and the scope of the technical idea of the disclosure is not limited thereto. Rather, these example embodiments are provided so that the disclosure will be thorough and complete and will fully convey the technical idea of the disclosure to those of ordinary skill.

The terms used herein are only used to describe certain example embodiments and are not intended to limit the scope of the disclosure. As used herein, singular expressions are intended to include plural forms as well, unless the context clearly dictates otherwise.

As used herein, expressions such as "have", "may have," "include" or "may include" are intended to indicate the presence of features (e.g., a numerical value, a function, an operation, a component of a machine part, etc.) and do not exclude the presence of additional features.

As used herein, expressions such as "A or B," "at least one of A or/and B," or "one or more of A or/and B" may include all possible combinations of items listed together. For example, "A or B," "at least one of A and B," or "at least one of A or B" may be understood to include (1) at least one A, (2) at least one B, or (3) at least one A and at least one B.

As used herein, the terms "first," "second," and the like may be used to describe various elements regardless of order and/or importance and distinguish one element from another element, but these elements should not be limited by these terms.

It will be understood that when an element (e.g., a first element) is referred to as being "operatively or communicatively coupled with/to" or "connected to" another element (e.g., a second element), the element may be directly connected to the other element or connected to the other element via another element (e.g., a third element).

On the other hand, it will be understood that when an element (e.g., a first element) is referred to as being "directly coupled" or "directly connected" to another element (e.g., a second element), another element (e.g., a third element) is not interposed between the element and the other element.

The expression "configured to (or set to)" used herein may be used interchangeably with, for example, "suitable for", "having the capacity to", "designed to", "adapted to", "made to", or "cable of" depending on circumstances. The expression "configured to (or set to)" may not be necessarily understood only as "specifically designed to" in terms of hardware. Instead, in some situations, the expression "device configured to . . . " may be understood to mean the device "configured to . . . " together with other devices or components. For example, the phrase "processor configured to (or set to) perform A, B, and C" may be understood as a dedicated processor (e.g., an embedded processor) for performing corresponding operations or a general-purpose processor (e.g., a CPU or an application processor) capable of executing one or more software programs or instructions stored in a memory device to perform the corresponding operations.

In embodiments, the term "module" or "part" may refer to an element performing at least one function or operation, and may be embodied as hardware, software, or a combination thereof. A plurality of "modules" or a plurality of "parts" may be integrated into at least one module to form at least one processor (not shown), except a "module" or "part" which need be embodied as particular hardware.

Meanwhile, various elements and areas in the drawings are schematically shown. Therefore, the technical idea of the disclosure is not limited by a relative size of each element or area or a relative gap between elements or areas shown in the accompanying drawings.

Embodiments of the disclosure will be described in detail with reference to the accompanying drawings below so that they may be easily implemented by those of ordinary skill.

Figure 2:
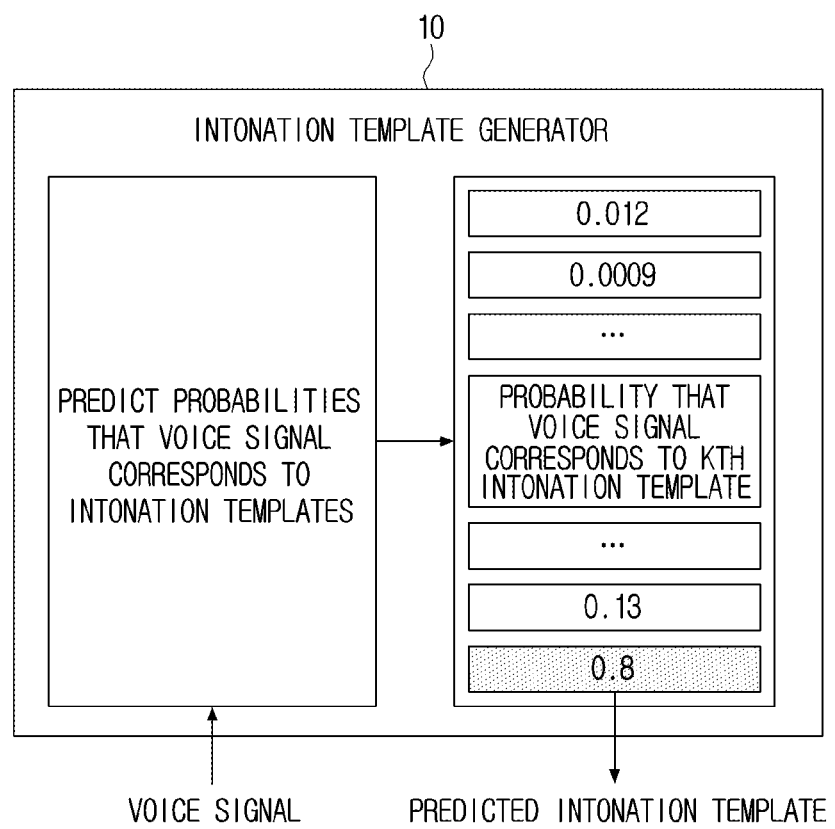
FIG. 2 is a diagram for describing in detail a configuration of an example intonation template generator according to various embodiments.
Figure 3:
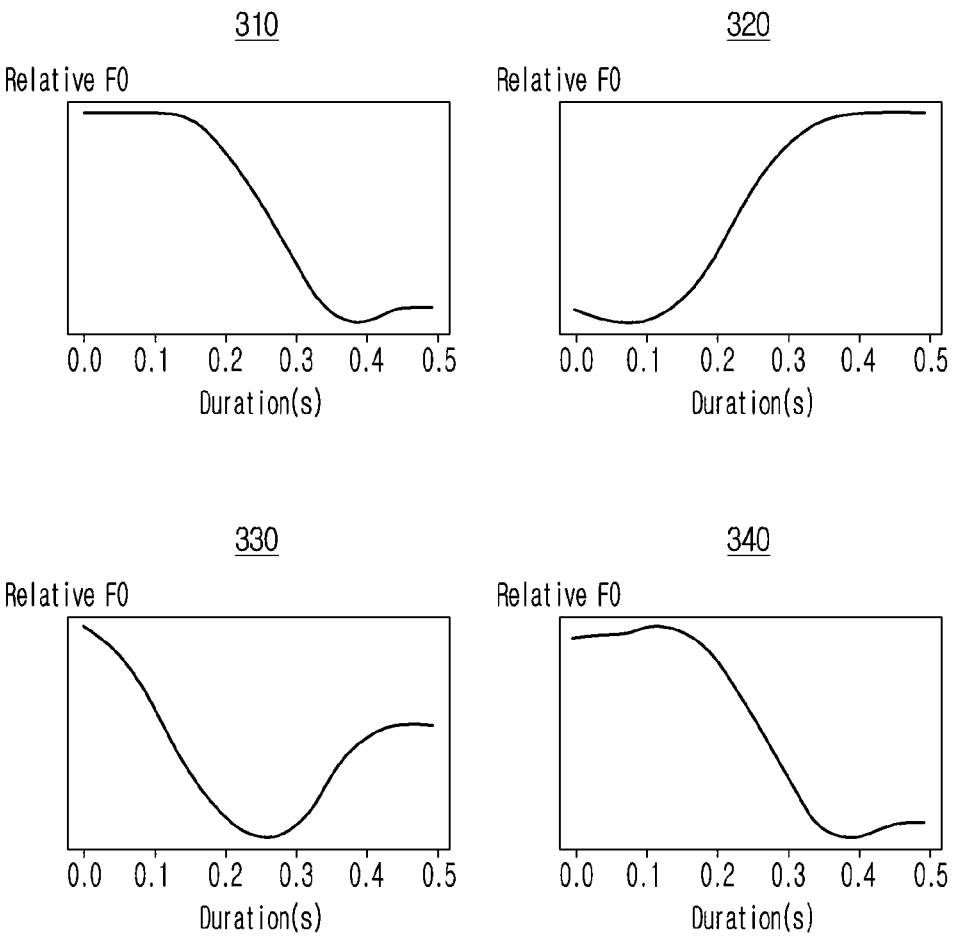
FIG. 3 is a diagram for describing a plurality of example intonation templates according to various embodiments.

FIG. 1 is a block diagram schematically illustrating a configuration of an example electronic device 100 according to various embodiments. FIG. 2 is a diagram for describing in detail a configuration of an example intonation template generator 10 according to various embodiments. FIG. 3 is a

Figure 4:
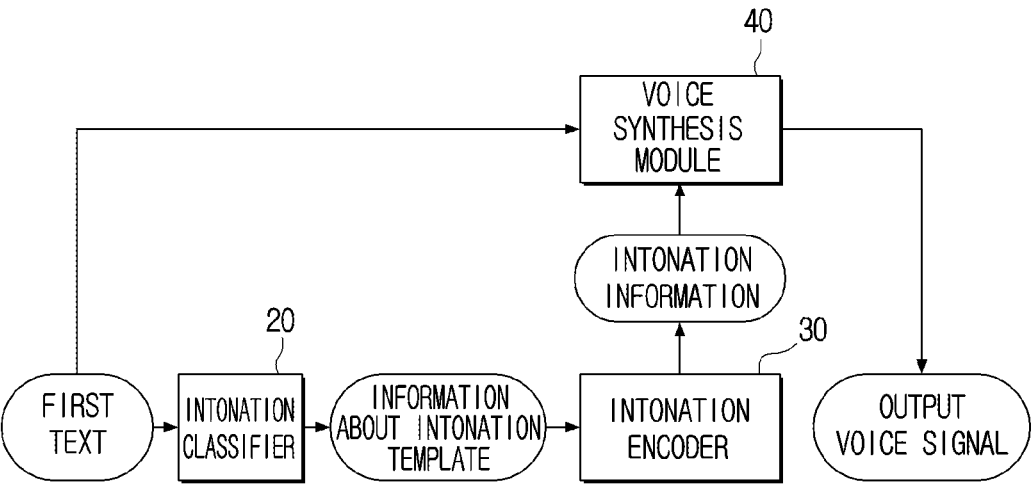
FIG. 4 is a block diagram illustrating a plurality of example modules according to various embodiments.

6 diagram for describing a plurality of example intonation templates according to various embodiments. FIG. 4 is a block diagram illustrating a plurality of example modules according to various embodiments. Hereinafter, various example embodiments of the disclosure will be described with reference to FIGS. 1, 2, 3, and 4.

As shown in FIG. 1, the electronic device 100 according to an embodiment of the disclosure may include a memory 110 and a processor 120.

The memory 110 may store at least one instruction regarding the electronic device 100. The memory 110 may also store an operating system (O/S) for driving the electronic device 100. The memory 110 may also store various types of software programs or applications for operating the electronic device 100 according to various example embodiments of the disclosure. Examples of the memory 110 may include a semiconductor memory 110 such as a flash memory, a magnetic storage medium such as a hard disk, and the like.

Specifically, the memory 110 may store various types of software modules for operating the electronic device 100 according to various embodiments of the disclosure, and the processor 120 may control the operation of the electronic device 100 by executing the various types of software modules stored in the memory 110. That is, the memory 110 may be accessed by the processor 120, and data may be read from, recorded on, modified in, deleted from, or updated in the memory 110 by the processor 120.

Meanwhile, in the disclosure, the "memory" 110 may be understood to include the memory 110, a ROM (not shown) or a RAM (not shown) included in the processor 120, or a memory card (not shown) (for example, a micro SD card, or a memory 110 stick) mounted in the electronic device 100.

In particular, in various example embodiments of the disclosure, the memory 110 may store information about a plurality of intonation templates that are obtained by training an intonation template generator by unsupervised learning based on a plurality of voice signals and that are classified according to pitches of the plurality of voice signals. The intonation template generator 10 will be described in more detail below.

The memory 110 may further store various information, such as information about multiple modules and a neural network module according to the disclosure, text, voice signals, intonation information, and score information according to the disclosure, and the like.

In addition, various other information may be stored in the memory 110, and the information stored in the memory 110 may be updated when new information is received from an external device or is input by a user.

The processor 120 (including, e.g., processing circuitry) controls overall operations of the electronic device 100. Specifically, the processor 120 may be connected to the components, including the memory 110, of the electronic device 100, and control overall operations of the electronic device 100 by executing at least one instruction stored in the memory 110 as described above.

The processor 120 may be implemented in various ways. For example, the processor 120 may be embodied as at least one of an application specific integrated circuit (ASIC), an embedded processor 120, a microprocessor 120, a hardware control logic, a hardware finite state machine (FSM), or a digital signal processor (DSP) 120. As used herein, the term "processor" 120 may be understood to include a central processing unit (CPU), a graphic processing unit (GPU), a micro-processor unit (MPU), and the like.

In particular, in various embodiments of the disclosure, the processor 120 may synthesize voice to reflect intonation matching the intention of an utterance using an intonation template. Specifically, the processor 120 may implement various embodiments of the disclosure using a plurality of modules as illustrated in FIG. 4. Hereinafter, a process of generating a plurality of intonation templates by the intonation template generator 10 will be described and thereafter a process of obtaining an output voice reflecting intonation matching the intention of an utterance will be described.

As described above, the memory 110 may store information on a plurality of intonation templates, and the processor 120 may train the intonation template generator 10 to generate a plurality of intonation templates and store information about the generated plurality of intonation templates in the memory 110.

The intonation template generator 10 is a module that includes a neural network and is capable of generating a plurality of intonation templates. As shown in FIG. 2, the intonation template generator 10 may be trained to predict probabilities that a voice signal corresponds to a plurality of intonation templates.

In particular, the processor 120 may generate a plurality of intonation templates by performing unsupervised learning of the intonation template generator 10 based on a plurality of voice signals. Unsupervised learning is a machine learning algorithm for training neural networks in a state in which labels for a plurality of voice signals, which are input data, are not designated, unlike in supervised learning. Specifically, the intonation template generator 10 may be trained by unsupervised learning based on a plurality of voice signals without using text data. In addition, the intonation template generator 10 may generate a plurality of intonation templates by clustering the plurality of voice signals according to a pattern or correlation between the plurality of voice signals by an unsupervised learning process.

Specifically, when a voice signal is input, the intonation template generator 10 may obtain a plurality of scores representing probabilities that the input voice signal corresponds to the plurality of intonation templates. The intonation template generator 10 may identify an intonation template with a highest score (an intonation template corresponding to a score 0.8 in an example of FIG. 2) as an intonation template corresponding to the input voice signal, and output information about the identified intonation template.

Meanwhile, the "plurality of intonation templates" may represent the intonation of the voice signals and be classified according to a pitch of the voice signal. Specifically, each of the plurality of intonation templates may include information about a pitch of the voice signal, i.e., the rise and fall in sound, for a preset time period. Specifically, graphs of FIG. 3 show a pitch ('relative F0' on a y-axis) of a voice signal when a preset time period ('duration' on an x-axis) is 0.5 seconds corresponding to an end of the voice signal. Here, the preset time period may be changed according to developer or user settings.

For example, as shown in FIG. 3, the plurality of intonation templates may include a template 310 representing a 'fall' in intonation, a template 320 representing a 'rise' in the intonation, a template 330 representing a 'falling-rising' in the intonation, and a template 340 representing a 'rising-falling' in the intonation.

However, the plurality of intonation templates shown in FIG. 3 are only examples, and the number and type of intonation templates may be determined differently according to developer or user settings. Voice synthesis may be performed more intuitively as the number of the plurality of intonation templates decreases, whereas voice synthesis may be performed while reflecting intonation more minutely as the number of the plurality of intonation templates increases.

Meanwhile, the plurality of intonation templates may be obtained based on voice uttered by multiple speakers or voice uttered by a specific speaker. In other words, the plurality of intonation templates may be a set of generalized templates or a set of templates specialized to mimic a certain speaker's (e.g., a celebrity) intonation. In an embodiment, a plurality of voice signals according to the disclosure may be obtained based on voice of a certain speaker selected by a user.

When first text that is a voice synthesis target is obtained, the processor 120 may input information about the first text to the intonation classifier 20 to identify an intonation template corresponding to the first text based on the information about the plurality of intonation templates.

In the disclosure, the term "first text" may refer, for example, to text that is a voice synthesis target. For example, the first text may be obtained by a user input, be obtained by converting a voice signal according to a user's utterance by a voice recognition module, or be received from an external device. As described below with reference to FIG. 6, the first text may refer, for example, not only to text that is a voice synthesis target but also response text output from a natural language understanding module 70.

The intonation classifier 20 is a module that includes a neural network and is capable of obtaining information about an intonation template corresponding to input text. Specifically, when text or a vector corresponding to the text is input, the intonation classifier 20 may identify an intonation template corresponding to the text or the vector among a plurality of intonation templates. When the intonation template is identified, the intonation classifier 20 may transmit information about the identified intonation template to the intonation encoder 30.

Meanwhile, when a plurality of voice signals and a plurality of intonation templates corresponding thereto are identified by training the intonation template generator 10 as described above, the processor 120 may obtain a plurality of pieces of text corresponding to a plurality of voice signals used to train the intonation template generator 10 using a voice recognition module and thus a plurality of intonation templates corresponding to the plurality of pieces of text may be identified. In addition, the processor 120 may input the plurality of pieces of text as input data to the intonation classifier 20 and train the intonation classifier 20 by using as labels the plurality of intonation templates corresponding to the plurality of pieces of text.

Although a process of automatically identifying the intonation template corresponding to the first text by the processor 120 has been described above, an intonation template may be determined by a user's selection.

In an embodiment, when a user input for changing an intonation template identified by the intonation classifier 20 to another intonation template is received, the processor 120 may input information about the other intonation template to the intonation encoder 30 to obtain intonation information and use the obtained intonation information to obtain an output voice signal. In other words, according to the disclosure, intonation information used to obtain an output voice signal may be obtained based on an intonation template automatically identified by the electronic device 100 (which may be referred to as an 'auto mode') or obtained based on a user's selection (which may be referred to as a 'manual mode').

The processor 120 may obtain the intonation information corresponding to the identified intonation template by inputting information about the identified intonation template to the intonation encoder 30.

The intonation encoder 30 is a module that includes a neural network and is capable of obtaining intonation information corresponding to information about an input intonation template. Specifically, when the information about the identified intonation template (i.e., information indicating the type of the identified intonation template) is received from the intonation classifier 20, the intonation encoder 30 may convert the information about the intonation template into a vector corresponding to the intonation template to obtain intonation information. When the intonation information is obtained, the intonation encoder 30 may transmit the obtained intonation information to the voice synthesis module 40.

The processor 120 may obtain an output voice signal corresponding to text by inputting the first text and the intonation information to the voice synthesis module 40.

In the disclosure, the term "output voice signal" may refer, for example, to a final voice signal obtained by the voice synthesis module 40, and is a term used to specify a voice signal corresponding to the first text that is a voice synthesis target.

The voice synthesis module 40 is a neural network module that includes a neural network and is capable of obtaining a voice signal corresponding to input text, and in particular, the voice synthesis module 40 according to the disclosure may be understood as a prosody module for estimating the pronunciation or intonation of voice among various types of text-to-speech (TTS) modules. Specifically, the voice synthesis module 40 may convert text into a voice signal and obtain an output voice signal by reflecting intonation information in the voice signal. A configuration of the voice synthesis module 40 will be described in detail with reference to FIG. 5 below.

When the output voice signal is obtained, the processor 120 may provide the obtained output voice signal. Specifically, the processor 120 may control a speaker included in the electronic device 100 to output the obtained output voice signal or control a communicator 130 (See FIG. 9) to transmit the output voice signal to an external device including a speaker.

A process of obtaining a plurality of scores representing probabilities that a voice signal corresponds to a plurality of intonation templates when the voice signal is received, obtaining information about a user's intention corresponding to the voice signal based on the plurality of scores, and obtaining first text based on the voice signal and the information about the user's intention has been described above, but the disclosure is not limited thereto. That is, the process of obtaining the first text according to the above-described embodiment is only an example, and even when the first text, which is a voice synthesis target, is obtained in a different way, the processor 120 may identify an intonation template corresponding to the first text, obtain intonation information corresponding to the identified intonation template, and obtain an output voice signal corresponding to text based on the first text and the intonation information.

According to the embodiments described above in detail with reference to FIGS. 1, 2, 3, 4, and 5, the electronic device 100 according to the disclosure may synthesize voice to reflect intonation matching the intention of an utterance using an intonation template.

Unlike a case in which a linguistic analysis is performed using text as input data and the text is tagged with information about the intonation of the end of a sentence, the electronic device 100 may generate a plurality of intonation templates using only a voice signal as input data by unsupervised learning and thus synthesize voice to reflect intonation corresponding to the intention of an utterance in a more efficient manner.

For example, when an embodiment of the disclosure is applied to an artificial intelligence (AI) speaker, the electronic device 100 may output sentences "Hello, I'm ABC (the name of a virtual assistant service)." and "I'm from Seoul" as a voice signal with "falling-rising" intonation to imply that the intention of an utterance is to provide an additional answer and thereafter output a sentence "And I'm ten years old." as a voice signal with "falling" intonation, when a user's utterance includes a plurality of questions, e.g., "Hi, who are you? Where are you from? How old are you?".

As another example, when the user's utterance is "You are a devil, Bixby.", the electronic device 100 may output a sentence "Thank you very much." as a voice signal with "rising" intonation to express that the intention of an utterance is to disagree with the user's utterance.

As another example, when the user's utterance is "I have a dinner reservation on Friday.", the electronic device 100 may output a sentence "Do you want me to set a reminder?" as a voice signal with "rising" intonation to express that the intention of an utterance is to grasp the user's intention, and when the user's utterance is "I have a dinner reservation on Friday. Please set a reminder", the electronic device 100 may output a sentence "Do you want me to set a reminder?" as a voice signal with "rising-falling" intonation to express that the intention of an utterance is to reconfirm the user's request.

Figure 5:
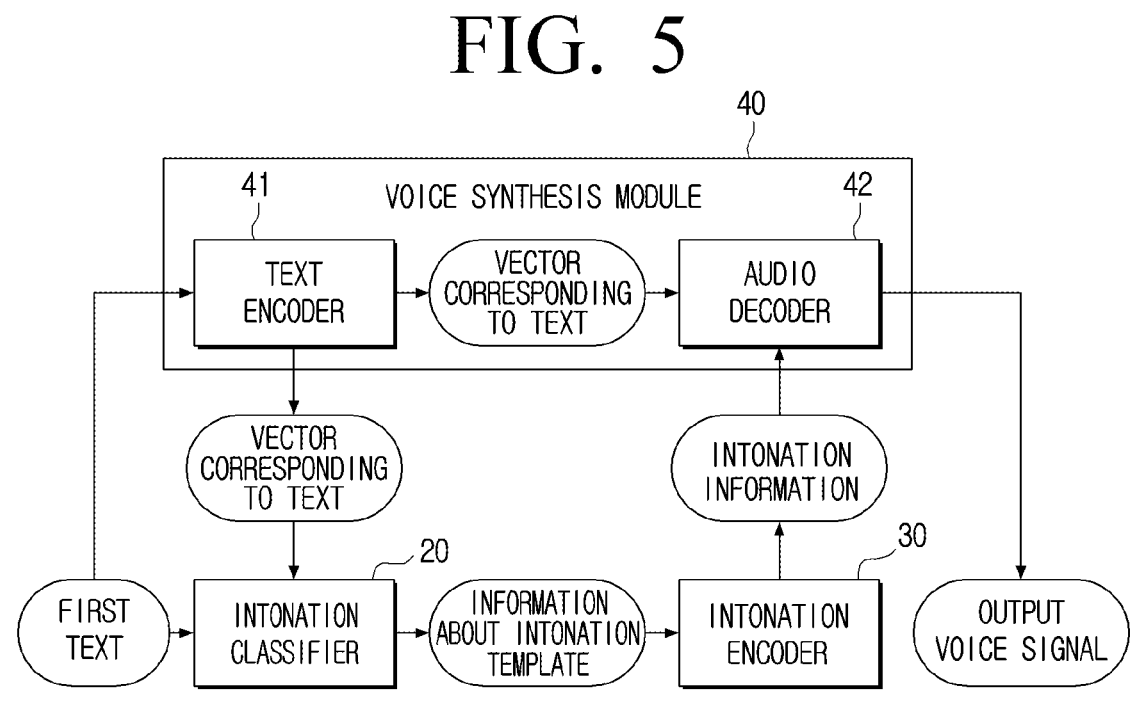

FIG. 5 is a diagram for describing an example text encoder 41 and an example audio decoder 42 according to various embodiments.

As shown in FIG. 5, the voice synthesis module 40 according to the disclosure may include a text encoder 41 and an audio decoder 42.

The text encoder 41 is a module that includes a neural network and is capable of obtaining a vector corresponding to input text. When a vector (i.e., encoded text) corresponding to text is obtained, the text encoder 41 may transmit the obtained vector to the intonation classifier 20 and the audio decoder 42.

The audio decoder 42 is a module that includes a neural network and is capable of obtaining an output voice signal corresponding to text. Specifically, when a vector corresponding to text is received from the text encoder 41 and intonation information is received from the intonation encoder 30, the audio decoder 42 may convert the vector corresponding to the text into a voice signal and obtain an output voice signal reflecting the intonation information in the voice signal. More specifically, the audio decoder 42 may obtain a spectrogram corresponding to the text based on the vector corresponding to the text and the intonation information and transmit the obtained spectrogram to a vocoder (not shown), and the vocoder may output an output voice signal based on an algorithm such as Griffin-Lim. FIG. 5 is based on an assumption that the vocoder is included in the audio decoder 42.

In an embodiment, the processor 120 may input first text to the text encoder 41 included in the voice synthesis module 40 to obtain a vector corresponding to the first text. The processor 120 may input the vector corresponding to the first text to the intonation classifier 20 to identify an intonation template corresponding to the first text based on information about a plurality of intonation templates. In addition, the processor 120 may input the vector corresponding to the first text and intonation information to the audio decoder 42 included in the voice synthesis module 40 to obtain an output voice signal corresponding to text.

In particular, as described above, when the intonation template corresponding to the first text is identified through the intonation classifier 20 using the vector that is an output of the text encoder 41, a delay in the calculation in the process of obtaining the intonation template corresponding to the first text and the intonation information corresponding to the intonation template may be minimized and the weight of the whole system may decrease.

In addition, according to the embodiment of FIG. 5, existing intonation that is highly compatible with the voice synthesis module 40 and matches the intention of an utterance may be reflected in the output voice signal.

Figure 6:
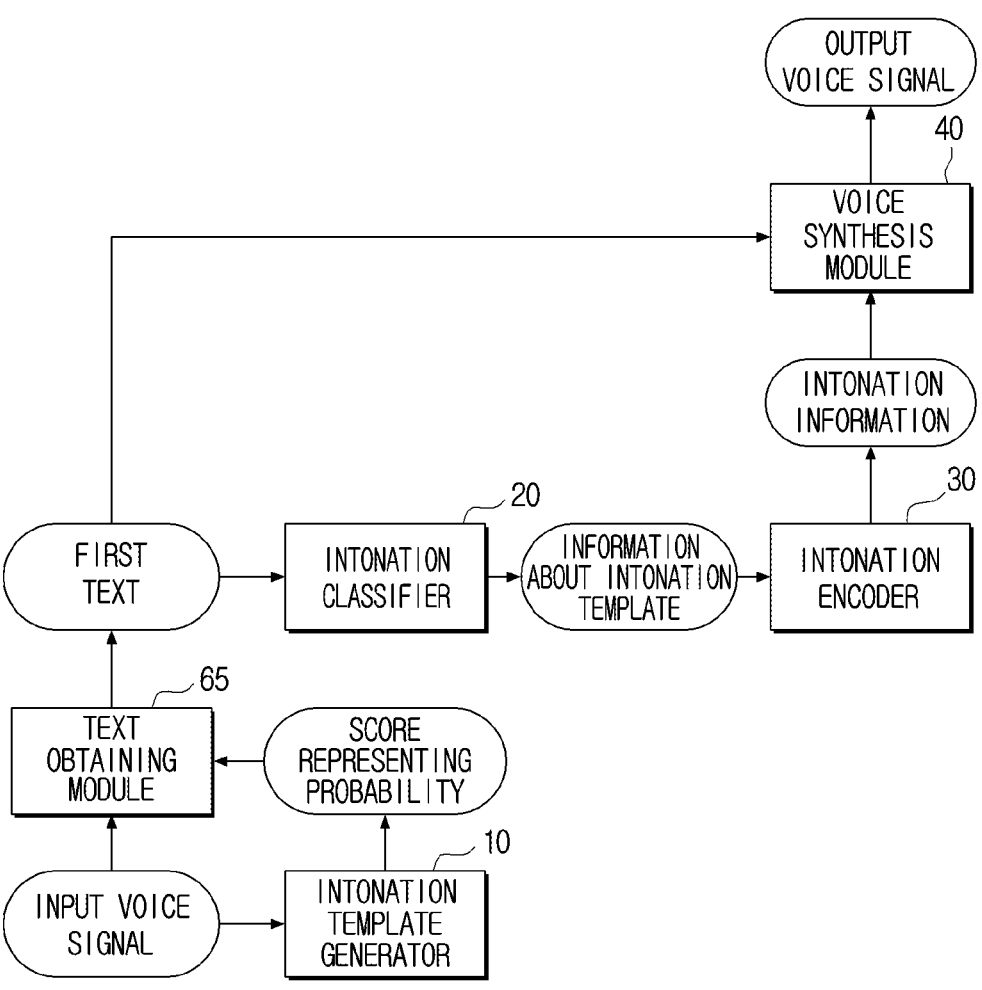
FIG. 6 is a diagram for describing an example text obtaining module according to various embodiments.
Figure 7:
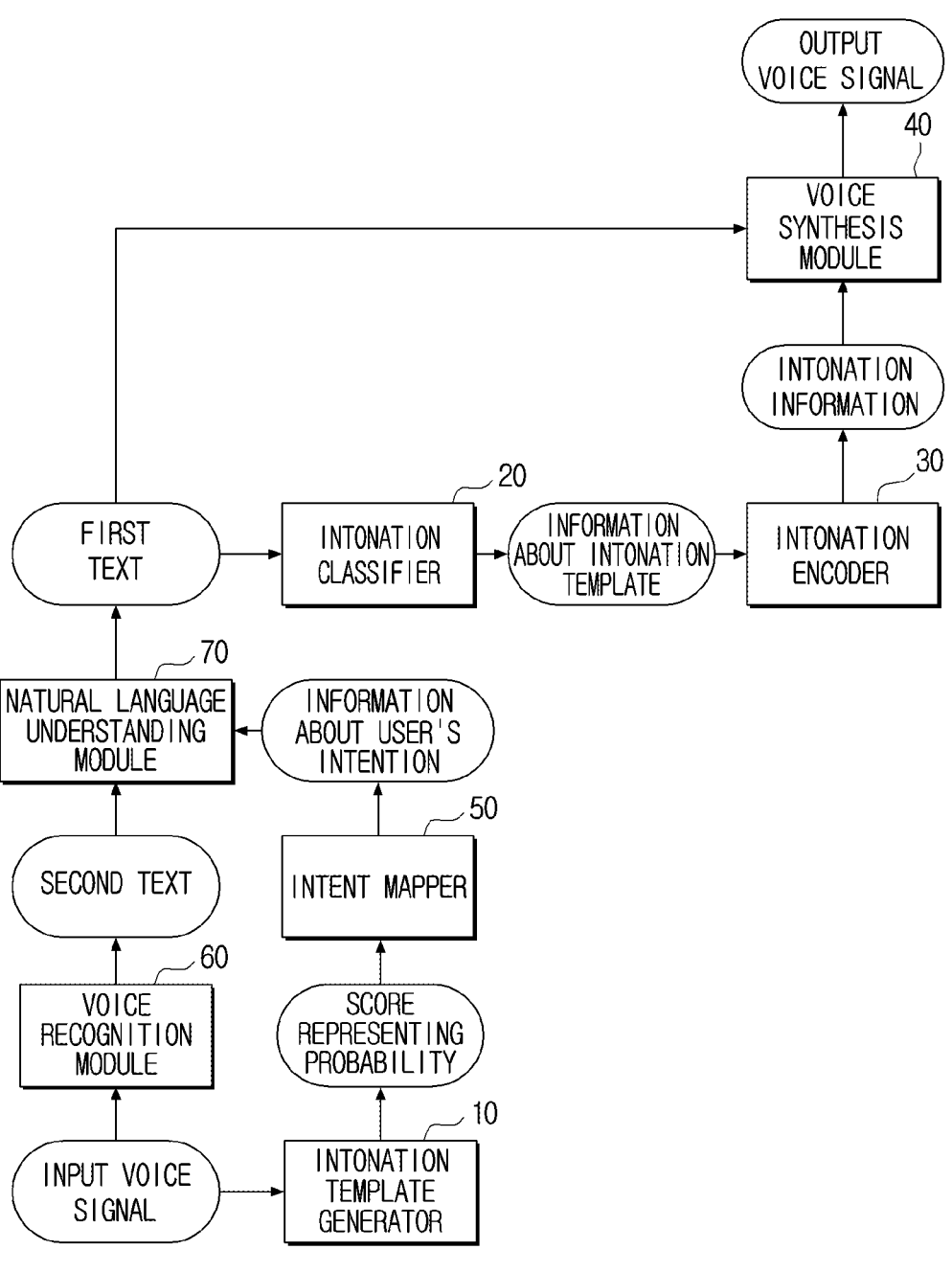
FIG. 7 is a diagram for describing an example intent mapper according to various embodiments.

FIG. 6 is a diagram for describing an example text obtaining module according to an various embodiments. FIG. 7 is a diagram for describing an example intent mapper according to various embodiments.

As shown in FIG. 6, an embodiment of the disclosure may be performed using not only an intonation classifier 20, an intonation encoder 30, and a voice synthesis module 40 but also a text obtaining module 65 and an intonation template generator 10.

Alternatively, as shown in FIG. 7, an embodiment of the disclosure may be performed using not only an intonation classifier 20, an intonation encoder 30, and a voice synthesis module 40 but also a voice recognition module 60, a natural language understanding module 70, an intent mapper 50, and an intonation template generator 10.

The intonation template generator 10 has been described above with reference to FIG. 2, and may obtain a plurality of scores representing probabilities that an input voice signal corresponds to a plurality of intonation templates as shown in FIG. 2. In addition, the intonation template generator 10 may identify an intonation template with a highest score as an intonation template corresponding to the input voice signal.

The text obtaining module 65 may obtain first text for responding to the input voice signal based on the input voice signal and the plurality of scores obtained by the intonation template generator 10. In the disclosure, the term "input voice signal" may refer, for example, to a voice signal input to the text obtaining module 65 of FIG. 6 or the voice recognition module 60 of FIG. 7, and particularly, a signal corresponding to voice that a user utters.

Specifically, the text obtaining module 65 may obtain the first text for responding to the input voice signal by reflecting a user's intention according to the plurality of scores obtained by the intonation template generator 10. A process of identifying a user's intention on a plurality of scores may be performed through the intent mapper 50 of FIG. 7. That is, the text obtaining module 65 may be understood as a model in which the intent mapper 50, the voice recognition module 60, and the natural language understanding module 70 of FIG. 7 are integrally implemented. The intent mapper 50, the voice recognition module 60, and the natural language understanding module 70 of FIG. 7 will be described in detail below.

The intent mapper 50 is a module that includes a neural network and is capable of mapping a plurality of scores obtained by the intonation template generator 10 to a user's intention. Specifically, when a plurality of scores representing probabilities that an input voice signal corresponds to a plurality of intonation templates are input from the intonation template generator 10, the intent mapper 50 may identify a user's intention corresponding to the plurality of scores and obtain information about the user's intention. In addition, the intent mapper 50 may be implemented as a bidirectional module to obtain a plurality of scores corresponding to a user's intention when information about the user's intention is input thereto.

In an embodiment, when a voice signal is received, the processor 120 may input the voice signal to the intonation template generator 10 to obtain a plurality of scores representing probabilities that the voice signal corresponds to a plurality of intonation templates. The processor 120 may input the plurality of scores to the intent mapper 50 to identify a user's intention corresponding to the voice signal among a plurality of predefined intents.

Meanwhile, the processor 120 may input an input voice signal to the voice recognition module 60 to obtain second text corresponding to the input voice signal. In addition, the processor 120 may input the second text and information about the identified intention of the user to the natural language understanding module 70 to obtain first text for responding to the second text. In the disclosure, the term "second text" may refer, for example, to an output of the voice recognition module 60 and an input of the natural language understanding module 70.

As described above with reference to FIGS. 1, 2, 3, 4, and 5, when first text is obtained, the processor 120 may input information about the first text to the intonation classifier 20 to identify an intonation template corresponding to the first text based on information about a plurality of intonation templates, input information about the identified intonation templates to the intonation encoder 30 to obtain intonation information corresponding to the identified intonation template, and input the first text and the intonation information to the voice synthesis module 40 to obtain an output voice signal corresponding to text. According to the example embodiments of FIGS. 6 and 7, the electronic device 100 may map a score of an intonation template to a user's intention based on a high correlation between intonation and the user's intention to use the user's intention in the natural language understanding module 70, thereby improving the performance of the natural language understanding module 70.

In addition, according to the embodiments of FIGS. 6 and 7, the intonation template generator 10 may not only generate an intonation template for voice synthesis using data output from one module but also identify a user's intention to understand a natural language. According to the disclosure, a reduction of the weight of the system and an improvement of an operation speed of the system are expected in that only a score according to an output of the intonation template generator 10 is used instead of using a voice signal.

In particular, in the case of a conventional natural language understanding module, it is difficult to accurately predict a user's intention when the user utters an informal interrogative sentence, e.g., when the user utters a declarative sentence with rising intonation. In contrast, according to the disclosure, information about a user's intention is obtained and used by a natural language understanding module and thus response text (i.e., first text) matching the intention of the user's utterance is obtained even when the user utters an informal interrogative sentence.

For example, in the case of a conventional natural language understanding module, it is difficult to predict that a user's intention is to "set a reminder" when the user utters a declarative sentence "I have a dinner reservation on Friday" with falling intonation, whereas the electronic device 100 according to the disclosure may obtain first text "Okay. I will set a reminder" by reflecting the user's intention.

Figure 8:
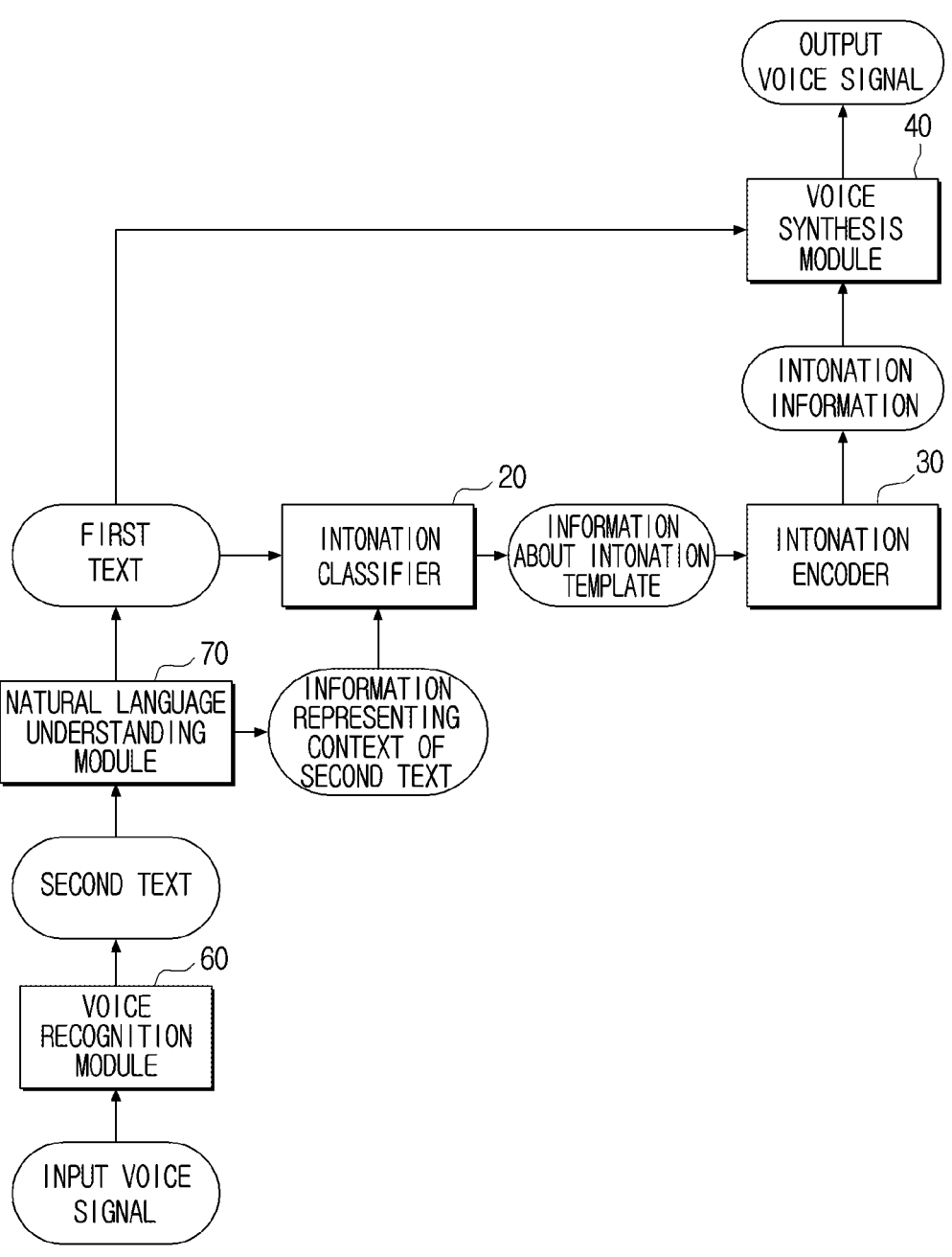
FIG. 8 is a diagram for describing an example intonation classifier according to various embodiments.

FIG. 8 is a diagram for describing an example intonation classifier 20 according to various embodiments.

As shown in FIG. 8, the processor 120 may input second text to the natural language understanding module 70 to obtain information about context of the second text, and input first text and the information about the context of the second text to the intonation classifier 20 to identify an intonation template corresponding to the first text.

Although not shown in FIG. 8, the intonation classifier 20 according to the disclosure may identify not only one intonation template among a plurality of intonation templates but also an intonation template obtained by combining at least some of the plurality of intonation templates. The combining of at least some of the plurality of intonation templates may be performed by a separate module, which may be referred to as a so-called "intonation fine-controller", but in the disclosure, it is assumed that a module such as the intonation fine-controller is included in the intonation classifier 20.

Specifically, the processor 120 may determine a ratio among a first intonation template, a second intonation template, a third intonation template, and a fourth intonation template to be reflected among the plurality of intonation templates to be 0.4:0.3:0.25:0.05, when a score representing a probability that the first text corresponds to the first intonation template is 0.4, a score representing a probability that the first text corresponds to the second intonation template is 0.3, a score representing a probability that the first text corresponds to the third intonation template is 0.25, and a score representing a probability that the first text corresponds to the fourth intonation template is 0.05. In addition, the processor 120 may generate a new intonation template by combining pitches of a voice signal represented by the first intonation template, the second intonation template, the third intonation template, and the fourth intonation template according to the determined ratio, and determine the generated intonation template as an intonation template corresponding to the first template.

According to the embodiment described above with reference to FIG. 8, when the first text is response text to the second text as illustrated in FIG. 8, the electronic device 100 may take into account the context of the second text as well as the first text to identify and use an intonation template for voice synthesis while more accurately reflecting a user's intention.

In addition, the electronic device 100 may use a combination of a plurality of intonation templates to obtain a voice signal reflecting a wider range of intonation than when the plurality of intonation templates is simply used. Furthermore, whether to combine the plurality of intonation templates may be determined by a user's selection, i.e., a user who pursues simplicity may use only the plurality of intonation templates and a user who wants to control intonation more finely may use a combination of the plurality of intonation templates.

The plurality of modules described above may be implemented as neural network modules, and at least some thereof may be integrated into one neural network module and may be end-to-end trained.

Figure 9:
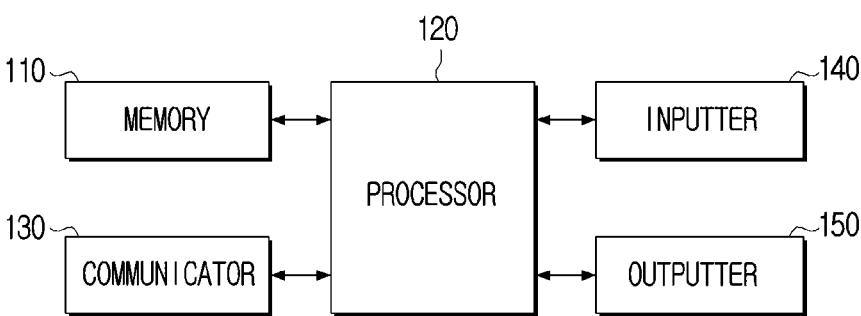
FIG. 9 is a block diagram illustrating in detail a configuration of an example electronic device according to various embodiments.
Figure 10:
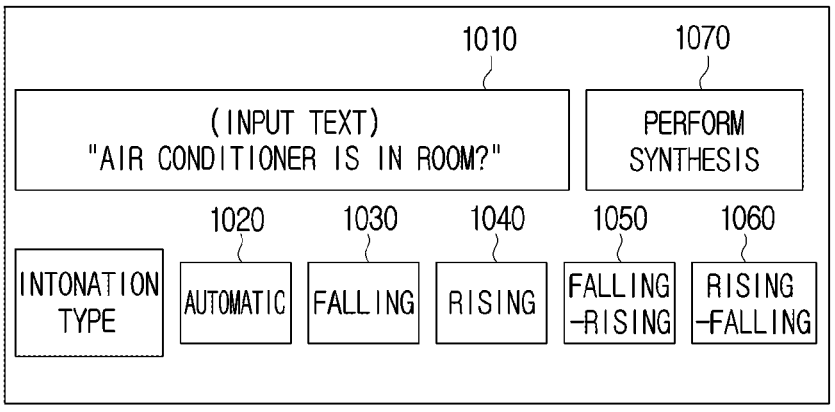
FIGS. 10 and 11 are diagrams illustrating in detail example user interfaces (UIs) according to various embodiments.
Figure 11:
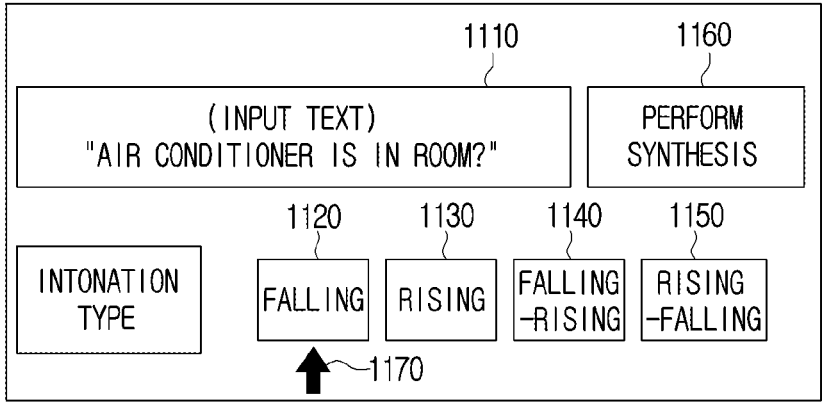

FIG. 9 is a block diagram illustrating in detail a configuration of an example electronic device 100 according to various embodiments. FIGS. 10 and 11 are diagrams illustrating in detail example user interfaces (UIs) according to various embodiments.

As illustrated in FIG. 9, the electronic device 100 according to an embodiment of the disclosure may further include a communicator 130, an inputter 140, and an outputter 150. However, the components shown in FIG. 9 are only examples, and new components may be added or some of the components shown in FIG. 9 may be omitted when the disclosure is implemented.

The communicator 130 may include a circuit and communicate with an external device. Specifically, the processor 120 may receive various types of data or information from an external device connected thereto through the communicator 130 and transmit various types of data or information to the external device.

The communicator 130 may include at least one of a Wi-Fi module, a Bluetooth module, a wireless communication module, a near-field communication (NFC) module, or an ultra-wide band (UWB) module. Specifically, the Wi-Fi module and the Bluetooth module may establish communication by a Wi-Fi method and a Bluetooth method, respectively. When the Wi-Fi module or the Bluetooth module is used, various types of connection information such as a service set identifier (SSID) may be transmitted or received, communication may be established using the various connection information, and thereafter various types of information may be transmitted or received.

The wireless communication module may establish communication according to various communication standards such as IEEE, ZigBee, 3rd Generation (3G), 3rd Generation Partnership Project (3GPP), Long-Term Evolution (LTE), 5th Generation (5G), etc. The NFC module may establish communication by an NFC method that uses a 13.56 MHz band among various radio frequency-identification (RF-ID) frequency bands such as 135 kHz, 13.56 MHz, 433 MHz, 860 to 960 MHz, and 2.45 GHz. The UWB module is capable of accurately measuring a time of arrival (ToA), which is time when a pulse reaches a target, and an angle of arrival (AoA), which is an angle at which a pulse arrives from a transmission device, through communication between UWB antennas, thereby enabling a distance and a position to be accurately recognized indoors within an error range of several tens of centimeters.

In particular, in various embodiments of the disclosure, the processor 120 may receive various types of information, such as information about a plurality of modules and a neural network module, information about intonation templates according to the disclosure, text, voice signals, intonation information, and score information, from an external device through the communicator 130. The processor 120 may receive various user inputs according to the disclosure from an external device through the communicator 130. In addition, the processor 120 may control the communicator 130 to transmit an output voice signal according to the disclosure.

The inputter 140 includes a circuit, and the processor 120 may receive a user command for controlling an operation of the electronic device 100 through the inputter 140. Specifically, the inputter 140 may include components such as a microphone, a camera (not shown), and a remote control signal receiver (not shown). The inputter 140 may be a touch screen included in a display.

In particular, the microphone may obtain a signal for sound or voice generated from the outside of the electronic device 100. Specifically, the microphone may obtain vibration according to sound or voice generated from the outside of the electronic device 100 and convert the vibration into an electrical signal.

The microphone may obtain a voice signal for a user's voice generated by the user's utterance. The obtained voice signal may be converted into a digital signal and stored in the memory 110. The microphone may include an analog-to-digital (A/D) converter and be operated in conjunction with an A/D converter located outside the microphone.

In particular, in various embodiments of the disclosure, the inputter 140 may receive an input voice signal generated by a user's utterance through the microphone. In addition, the processor 120 may receive various user inputs such as a user input for selecting one of a plurality of intonation templates according to the disclosure through the inputter 140.

The outputter 150 may include a circuit, and the processor 120 may output information about various functions that the electronic device 100 may perform through the outputter 150. The outputter 150 may include at least one of a display, a speaker, and an indicator.

The display may output image data under control of the processor 120. Specifically, the display may output an image stored in the memory 110 under control of the processor 120.

In particular, the display according to an embodiment of the disclosure may display a UI stored in the memory 110. The display may be embodied as a liquid crystal display (LCD) Panel, an organic light-emitting diode (OLED) or the like or may be embodied as a flexible display, a transparent display or the like in some cases. However, the display according to the disclosure is not limited to a specific type.

The speaker may output audio data under control of the processor 120, and the indicator may be turned on under control of the processor 120.

In particular, in various embodiments of the disclosure, the processor 120 may control the speaker to output an output voice signal. In addition, the processor 120 may control the display to display various UIs according to the disclosure. In an embodiment, when a user input for changing an intonation template identified by the intonation classifier 20 to another intonation template is received through a UI, the processor 120 may input information about the other intonation template to the intonation encoder 30 to obtain intonation information.

Referring to the example of FIG. 10, an example UI according to the disclosure may include a region 1010 indicating input text (i.e. text that is a voice synthesis target), a UI item 1020 for receiving an input for automatically identifying intonation (i.e., an intonation template and intonation information thereof) by the electronic device 100, UI items 1030, 1040, 1050, and 1060 for receiving a UI for manually selecting "falling" intonation, "rising" intonation, "falling-rising" intonation or "rising-falling" intonation, a UI item 1070 for receiving an input for starting voice synthesis after a user's selection, and the like.

Referring to the example of FIG. 11, a UI according to the disclosure may include a region 1110 indicating input text, UI items 1120, 1130, 1140 and 1150 for receiving an input for manually selecting "falling" intonation, "rising" intonation, "falling-rising" intonation or "rising-falling" intonation, and a UI item 1160 for receiving an input for starting voice synthesis after a user's selection. Referring to the example of FIG. 11, the UI may include a UI item 1170 indicating a result of automatically identifying intonation by the electronic device 100 instead of the UI item 1020 for receiving an input for automatically identifying intonation by the electronic device 100.

That is, in the example embodiment of FIG. 11, after intonation is automatically identified by the electronic device 100, a UI is provided to a user to receive a confirmation as to whether to change the intonation to another intonation, unlike in the example embodiment of FIG. 10.

Meanwhile, as in the above-described example embodiment, when a user input for selecting an intonation template is received, a processor may obtain information about a history of selecting the intonation template according to user input and re-train an intonation classifier based on the information about the history of selecting the intonation template, thereby updating the intonation classifier to be personalized.

When a UI as described above is provided, it is possible to intuitively select intonation, which is to be used for voice synthesis, using a pre-built and visualized intonation template, and set an intonation template to be automatically identified by the electronic device 100, thereby providing convenience to a user who would feel cumbersome in selecting intonation whenever voice synthesis is performed.

For example, in the examples of FIGS. 10 and 11, when a user wants to synthesize an interrogative sentence for gently reconfirming the presence of an air conditioner in the room, the user may select an intonation template with "falling" intonation while inputting text "Is there an air conditioner in the room?", and select an "perform synthesis" UI item, so that a voice signal with intonation matching the intention of the user's utterance may be output. Meanwhile, in the examples of FIGS. 10 and 11, when a user wants to synthesize a declarative sentence expressing that it is unbelievable that there is an air conditioner in the room, the user may select an intonation template with "rising" intonation while inputting text "An air conditioner is in in the room?", and select the "perform synthesis" UI item, so that a voice signal with intonation matching the intention of the user's utterance may be output.

Figure 12:
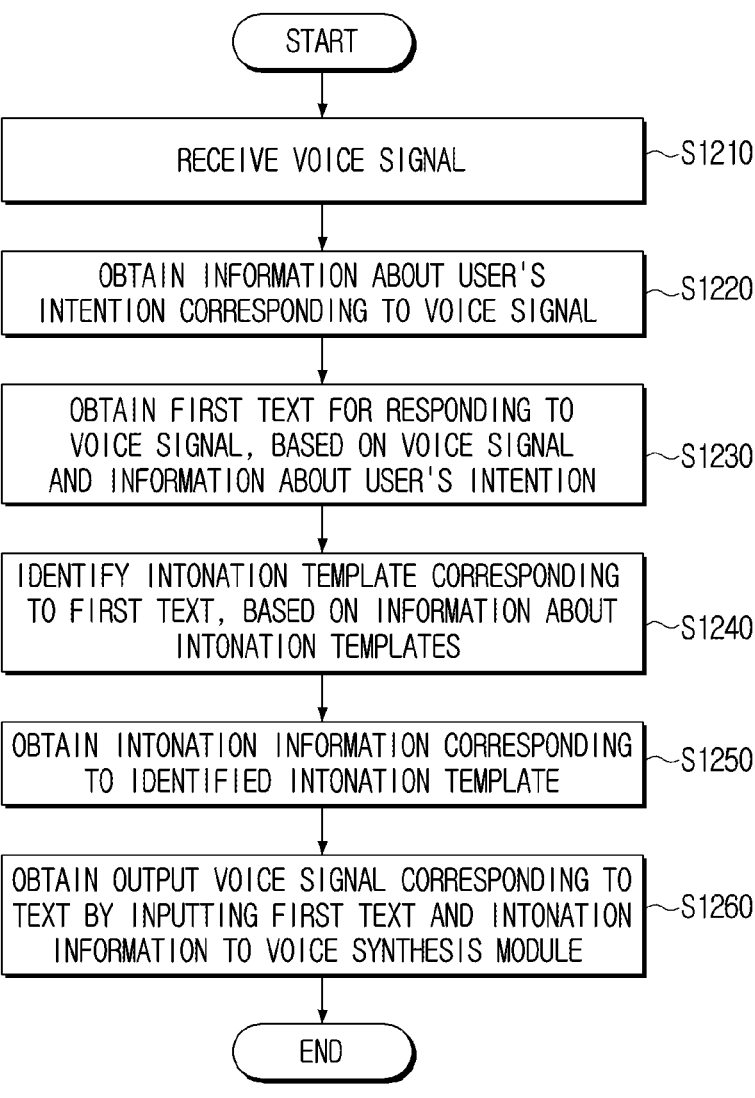
FIG. 12 is a flowchart of an example control method of an electronic device according to various embodiments.

FIG. 12 is a flowchart of a control method of an example electronic device 100 according to various embodiments.

As shown in FIG. 12, the electronic device 100 may receive a voice signal (S1210). Specifically, the electronic device 100 may receive a voice signal (an input voice signal) generated by a user's utterance through the microphone of the electronic device 100. Alternatively, the electronic device 100 may receive a voice signal from an external device through the communicator 130 of the electronic device 100.

When the voice signal is received, the electronic device 100 may obtain information about the user's intention corresponding to the voice signal (S1220). Specifically, the electronic device 100 may obtain a plurality of scores representing probabilities that the voice signal corresponds to a plurality of intonation templates through the intonation template generator 10.

When the plurality of scores is obtained, the electronic device 100 may obtain information about the user's intention corresponding to the voice signal based on the plurality of scores. Specifically, the electronic device 100 may obtain information about the user's intention by mapping the plurality of scores to the user's intention through the intent mapper 50.

The electronic device 100 may obtain first text for responding to the voice signal based on the voice signal and the information about the user's intention (S1230). Specifically, the electronic device 100 may obtain the first text using the text obtaining module 65, based on the voice signal and the plurality of scores obtained through the intonation template generator 10. In addition, the electronic device 100 may obtain second text corresponding to the voice signal by inputting the voice signal to the voice recognition module 60. In addition, the electronic device 100 may obtain the first text for responding to the second text by inputting the second text and the information about the identified intention of the user to the natural language understanding module 70.

The electronic device 100 may identify an intonation template corresponding to the first text based on the information about the plurality of intonation templates (S1240). The electronic device 100 may identify the intonation template corresponding to the first text using the intonation template generator 10. Specifically, when text or a vector corresponding to the text is input, the intonation classifier 20 may identify an intonation template corresponding to the text or the vector among a plurality of intonation templates. When the intonation template is identified, the intonation classifier 20 may transmit information about the identified intonation template to the intonation encoder 30.

When the intonation template is identified, the electronic device 100 may obtain intonation information corresponding to the identified intonation template (S1250). The electronic device 100 may obtain intonation information corresponding to the identified intonation template using the intonation encoder 30. Specifically, when the information about the identified intonation template (i.e., information indicating the type of the identified intonation template) is received from the intonation classifier 20, the intonation encoder 30 may convert the information about the intonation template into a vector corresponding to the intonation template to obtain intonation information. The electronic device 100 may obtain an output voice signal corresponding to text by inputting the first text and the intonation information to the voice synthesis module 40 (S1260). Specifically, the voice synthesis module 40 may convert the text into a voice signal and obtain an output voice signal by reflecting the intonation information in the voice signal.

When the output voice signal is obtained, the electronic device 100 may provide the obtained output voice signal. Specifically, the electronic device 100 may output the output voice signal through the speaker or transmit the output voice signal to an external device with a speaker.

A process of obtaining a plurality of scores representing probabilities that a voice signal corresponds to a plurality of intonation templates when the voice signal is received, obtaining information about a user's intention corresponding to the voice signal based on the plurality of scores, and obtaining first text based on the voice signal and the information about the user's intention has been described above, but the disclosure is not limited thereto. That is, the process of obtaining the first text according to the above-described embodiment is only an example, and even when the first text, which is a voice synthesis target, is obtained in a different way, the electronic device 100 may identify an intonation template corresponding to the first text, obtain intonation information corresponding to the identified intonation template, and obtain an output voice signal corresponding to text based on the first text and the intonation information.

Meanwhile, the control method of the electronic device 100 according to the above-described embodiment may be implemented as a program and provided to the electronic device 100. In particular, a program including the control method of the electronic device 100 may be provided while being stored in a non-transitory computer-readable medium.

Specifically, in the non-transitory computer-readable medium storing the program for performing the control method of the electronic device 100, the control method of the electronic device 100 may include obtaining first text that is a voice synthesis target, identifying an intonation template corresponding to the first text based on information about a plurality of intonation templates, which are obtained by unsupervised-training the intonation template generator 10 based on a plurality of voice signals and classified according to pitches of the plurality of voice signals, obtaining intonation information corresponding to the identified intonation template, and obtaining an output voice signal corresponding to text by inputting the first text and the intonation information to the voice synthesis module 40.

Although the control method of the electronic device 100 and the non-transitory computer-readable recording medium storing the program for performing the control method of the electronic device 100 have been briefly described above to avoid redundant description, various embodiments of the electronic device 100 may be also applicable to the control method of the electronic device 100 and the non-transitory computer-readable recording medium storing the program for performing the control method of the electronic device 100.

According to various embodiments of the disclosure as described above, the electronic device 100 of the disclosure may synthesize voice to reflect intonation matching the intention of an utterance by using an intonation template.

An AI-related function according to the disclosure is performed through the processor 120 and the memory 110 of the electronic device 100.

The processor 120 may include one or more processors 120. In this case, the one or more processors 120 may include, but are not limited to, at least one of a central processing unit (CPU), a graphic processing unit (GPU), or a neural processing unit (NPU).

The CPU is a general-purpose processor 120 capable of performing AI operations as well as general operations, and may efficiently execute complex programs through a multi-layer cache structure. The CPU is advantageous for a serial processing method in which a previous calculation result and a subsequent calculation result may be organically connected to each other through sequential calculations. The general-purpose processor 120 is not limited to the above-described examples unless it is specified as the CPU described above.

The GPU is a processor 120 configured to perform a large amount of calculation, such as floating point operations for graphic processing, in which cores are integrated at a large scale to perform large-scale calculations in parallel. In particular, the GPU may be more advantageous than the CPU in terms of a parallel processing method such as a convolution operation. The GPU may be also used as a co-processor 120 to supplement functions of the CPU. The processor 120 configured to perform a large amount of calculation is not limited to the above-described examples unless it is specified as the GPU described above.

The NPU is a processor 120 specialized for AI operations using an artificial neural network, in which each layer of the artificial neural network may be implemented using hardware (e.g., silicon). In this case, the NPU is designed to be specialized according to specifications required by a company and thus a degree of freedom thereof is lower than that of the CPU or the GPU, but the NPU is capable of efficiently processing AI operations. Meanwhile, the NPU, which is the processor 120 specialized for AI operations, may be embodied in various forms such as a tensor processing unit (TPU), an intelligence processing unit (IPU), and a vision processing unit (VPU). The AI processor 120 is not limited to the above-described examples unless it is specified as the NPU described above.

Alternatively, the one or more processors 120 may be embodied as a system-on chip (SoC). In this case, the SoC may further include the memory 110 and a network interface, e.g., a bus, for data communication between the processor 120 and the memory 110, in addition to the one or more processors 120.

When a plurality of processors 120 are included in the SoC included in the electronic device 100, the electronic device 100 may perform an AI-related operation (e.g., an operation related to training an AI module or inference) using some of the plurality of processors 120. For example, the electronic device 100 may perform an AI-related operation using at least one of a GPU, an NPU, a VPU, a TPU, or a hardware accelerator specialized for AI operations, such as a convolution operation and a matrix multiplication operation, among the plurality of processors 120. However, the above description is only an example and AI-related operations may be processed using a general-purpose processor such as a CPU.

In addition, the electronic device 100 may perform an operation on an AI-related function using a multi-core (e.g., a dual-core, a quad-core or the like) included in one processor 120. In particular, the electronic device 100 may perform AI-related operations, such as a convolution operation and a matrix multiplication operation, in parallel using the multi-core included in the processor 120.

The one or more processors 120 controls input data to be processed according to a predefined operation rule or an AI module stored in the memory 110. The predefined operation rule or the AI module may be generated by learning. Here, the generating of the predefined operation rule or the AI module by learning may refer, for example, to a predefined operation rule or AI module corresponding to a desired feature being generated by applying a learning algorithm to a plurality of pieces of training data. Such learning may be made by a device that performs AI according to the disclosure or by a separate server/system.

The AI module may include a plurality of layers of a neural network. At least one weight value is assigned to at least one layer, and an operation is performed on the at least one layer through a result of performing the operation on a previous layer and at least one defined operation. Examples of the neural network of the disclosure include a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-networks, and a transformer, but are not limited thereto unless specified otherwise.

The learning algorithm is a method of training a target device (e.g., a robot) using a plurality of pieces of training data such that the target device may make decisions or predictions by itself. Examples of the learning algorithm may include supervised learning, unsupervised learning, semi-supervised learning, or reinforcement learning, but are not limited thereto unless specified otherwise.

A machine-readable storage medium may be provided in the form of a non-transitory storage medium. Here, the term "non-transitory storage medium" refers, for example, to a tangible device and should be understood to not include a signal (e.g., an electromagnetic wave), but is not intended to distinguish between a case in which data is semi-permanently stored in the storage medium and a case in which data is temporarily stored in the storage medium. For example, the 'non-transitory storage medium' may include a buffer in which data is temporarily stored.

In an embodiment, methods according to various embodiments as set forth herein may be provided by being included in a computer program product. The computer program product may be traded as a product between a seller and a purchaser. The computer program product may be distributed in the form of a storage medium (e.g., compact disc read only memory (CD-ROM)) that is readable by devices, may be distributed through an application store (e.g., Play Store™) or directly between two user devices (e.g., smartphones), or may be distributed online (e.g., by downloading or uploading). In the case of an online distribution, at least part of the computer program product (e.g., a downloadable application) may be at least temporarily stored in a machine-readable storage medium such as a server of the manufacturer, a server of an application store, or the memory of a relay server or may be temporarily generated.

Each component (e.g., a module or a program) of various embodiments of the disclosure as described above may include a single entity or a plurality of entities, and some of the sub-components described above may be omitted or other sub-components may be further included in various embodiments. Alternatively or additionally, some components (e.g., modules or programs) may be integrated into one entity to perform functions, which are performed by the components prior to the integration, in the same or similar manner. Operations performed by a module, a program, or another component according to various embodiments may be performed in a sequential, parallel, iterative, or heuristic manner, at least some of the operations may be performed in a different order or omitted, or other operations may be added.

Meanwhile, the term "part" or "module" used herein includes a unit configured as hardware, software, or firmware, or any combination thereof, and may be used interchangeably with terms such as logic, logic block, component, or circuit. A "part" or "module" may be understood as an integral component or a minimum unit for performing one or more functions or part of the minimum unit. For example, a module may be configured as an application-specific integrated circuit (ASIC).

Various embodiments of the disclosure may be implemented by software including instructions stored in a machine (e.g., a computer) readable storage medium. The machine is a device capable of calling an instruction stored in a storage medium and operating according to the called instruction and may include an electronic device (e.g., the electronic device 100) according to the embodiments set forth herein.

When the instruction is executed by a processor, a function corresponding to the instruction may be performed directly by the processor or under control of the processor. The instructions may include code generated or executed by a compiler or an interpreter.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

memory configured to store information about a plurality of intonation templates obtained by performing unsupervised learning based on a plurality of voice signals, the plurality of intonation templates representing intonations classified according to pitches of the plurality of voice signals; and at least one processor, comprising processing circuitry, configured to:

based on a voice signal being received, obtain a plurality of scores each representing a probability that the received voice signal corresponds to one of the plurality of intonation templates by inputting the received voice signal to an intonation template generator;

obtain information about a user's intention corresponding to the received voice signal based on the plurality of scores; and obtain first text to respond to the received voice signal by inputting the received voice signal and the information about the user's intention to a text obtaining model.

2. The electronic device as claimed in claim 1, wherein at least one processor comprising processing circuitry is configured to:

identify an intonation template corresponding to the first text based on the information about the plurality of intonation templates by inputting information about the first text to an intonation classifier;

obtain intonation information corresponding to the identified intonation template by inputting information about the identified intonation template to an intonation encoder; and obtain an output voice signal corresponding to the first text by inputting the first text and the intonation information to a voice synthesizer.

3. The electronic device as claimed in claim 2, wherein at least one processor comprising processing circuitry is configured to:

identify the user's intention among a plurality of predefined intentions by inputting the plurality of scores to an intent mapper;

obtain second text corresponding to the voice signal; and obtain the first text to respond to the second text using natural language understanding based on the second text and the information about the user's intention.

4. The electronic device as claimed in claim 3, wherein at least one processor comprising processing circuitry is configured to:

obtain information representing context of the second text using natural language understanding; and identify the intonation template corresponding to the first text by inputting the first text and the information representing the context of the second text to the intonation classifier.

5. The electronic device as claimed in claim 2, wherein at least one processor comprising processing circuitry is configured to identify the intonation template corresponding to the first text among the plurality of templates or among combinations of at least some templates among the plurality of templates by inputting the first text to the intonation classifier.

6. The electronic device as claimed in claim 2, wherein at least one processor comprising processing circuitry is configured to, based on an input for changing an intonation template identified by the intonation classifier to another intonation template, obtain the intonation information by inputting information about the other intonation template to the intonation encoder.

7. The electronic device as claimed in claim 2, wherein at least one processor comprising processing circuitry is configured to:

obtain a vector corresponding to the first text by inputting the first text to a text encoder included in the voice synthesizer;

identify an intonation template corresponding to the vector based on the information about the plurality of intonation templates by inputting the vector corresponding to the first text to the intonation classifier; and obtain the output voice signal corresponding to the first text by inputting the vector and the intonation information to an audio decoder included in the voice synthesizer.

8. The electronic device as claimed in claim 1, wherein the intonation template generator is trained based on the plurality of voice signals without using text data.

9. The electronic device as claimed in claim 1, wherein the plurality of voice signals is obtained based on a user-selected voice of a certain speaker.

10. A control method of an electronic device, the method comprising:

storing information about a plurality of intonation templates obtained by unsupervised training of an intonation template generator based on a plurality of voice signals, the plurality of intonation templates representing intonations classified according to pitches of the plurality of voice signals;

based on a voice signal being received, obtaining a plurality of scores each representing a probability that the received voice signal corresponds to one of the plurality of intonation templates by inputting the received voice signal to the intonation template generator;

obtaining information about a user's intention corresponding to the received voice signal based on the plurality of scores; and obtaining first text to respond to the received voice signal by inputting the received voice signal and the information about the user's intention to a text obtaining model.

11. The control method as claimed in claim 10, further comprising:

identifying an intonation template corresponding to the first text based on the information about the plurality of intonation templates by inputting information about the first text to an intonation classifier;

obtaining intonation information corresponding to the identified intonation template by inputting information about the identified intonation template to an intonation encoder; and obtaining an output voice signal corresponding to the first text by inputting the first text and the intonation information to a voice synthesizer.

12. The control method as claimed in claim 11, further comprising:

identifying the user's intention among a plurality of previously defined intentions by inputting the plurality of scores to an intent mapper;

obtaining second text corresponding to the voice signal; and obtaining the first text to respond to the second text using natural language understanding based on the second text and the information about the user's intention.

13. The control method as claimed in claim 12, further comprising:

obtaining information representing context of the second text using natural language understanding; and identifying the intonation template corresponding to the first text based on the first text and the information representing the context of the second text.

14. The control method as claimed in claim 11, further comprises, based on an input for changing an intonation template identified by the intonation classifier to another intonation template, obtaining the intonation information by inputting information about the other intonation template to the intonation encoder.

15. The control method as claimed in claim 11, further comprising:

obtaining a vector corresponding to the first text by inputting the first text to a text encoder included in the voice synthesizer;

identifying an intonation template corresponding to the vector based on the information about the plurality of intonation templates by inputting the vector corresponding to the first text to the intonation classifier; and obtaining the output voice signal corresponding to the first text by inputting the vector and the intonation information to an audio decoder included in the voice synthesizer.

16. The control method as claimed in claim 10, wherein the intonation template generator is trained based on the plurality of voice signals without using text data.

17. The control method as claimed in claim 11, wherein the identifying of the intonation template comprises identifying the intonation template corresponding to the first text among the plurality of intonation templates or among combinations of at least some intonation templates among the plurality of intonation templates by inputting the first text to an intonation classifier.

18. The control method as claimed in claim 10, wherein the plurality of voice signals is obtained based on a user-selected voice of a certain speaker.

19. A non-transitory computer readable recording medium including a program that, when executed by at least one processor of an electronic apparatus, causes the electronic apparatus to perform operations comprising:

storing information about a plurality of intonation templates obtained by unsupervised training of an intonation template generator based on a plurality of voice signals, the plurality of intonation templates representing intonations classified according to pitches of the plurality of voice signals;

based on a voice signal being received, obtaining a plurality of scores each representing a probability that the received voice signal corresponds to one of the plurality of intonation templates by inputting the received voice signal to the intonation template generator;

obtaining information about a user's intention corresponding to the received voice signal based on the plurality of scores; and obtaining first text to respond to the received voice signal by inputting the received voice signal and the information about the user's intention to a text obtaining model.

20. The non-transitory computer readable recording medium as claimed in claim 19, wherein the operations further comprise:

identifying an intonation template corresponding to the first text based on the information about the plurality of intonation templates by inputting information about the first text to an intonation classifier;

obtaining intonation information corresponding to the identified intonation template by inputting information about the identified intonation template to an intonation encoder; and obtaining an output voice signal corresponding to the first text by inputting the first text and the intonation information to a voice synthesizer.

* * * * *